Dec. 18, 1956 R. B. TROUSDALE 2,774,888
ELECTRONIC SWITCH
Filed Aug. 23, 1955
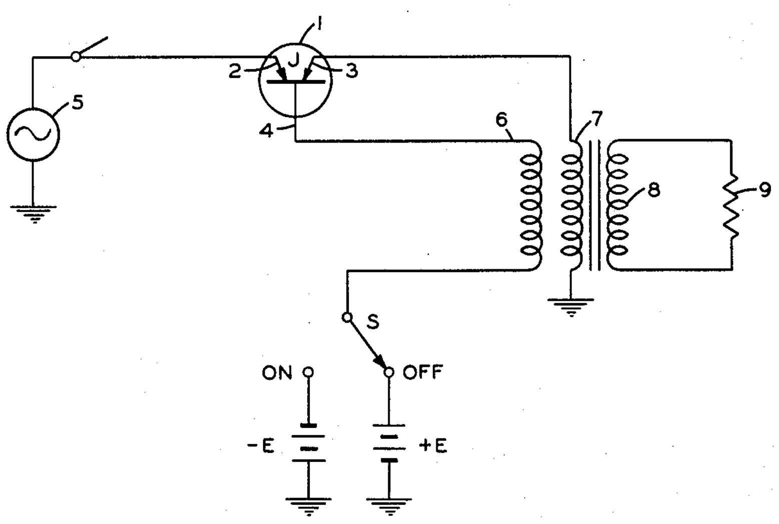
INVENTOR.
ROBERT B. TROUSDALE
BY F. H. Henson
AGENT

United States Patent Office 2,774,888

Patented Dec. 18, 1956

2,774,888

ELECTRONIC SWITCH

Robert B. Trousdale, Webster, N. Y., assignor to General Dynamics Corporation, a corporation of Delaware Application August 23, 1955, Serial No. 530,089

6 Claims. (Cl. 307—88.5)

This invention relates in general to electrical circuits, and more particularly to electronic switches for use in controlling electrical circuits.

With the advent of electronically controlled telephone and other communication systems, a need has arisen for an inexpensive electronic switch capable of switching communication and control signals without undue attenuation or distortion. For example, in the electronic telephone system disclosed in my copending application, Serial No. 492,064, filed March 4, 1955, and assigned to the same assignee as the present invention, electronic switches are utilized to close the communication circuit between a calling line and a selected called line, to connect a ringing source to the called line, and for many other purposes.

An electronic switch comprising a bilateral transistor is disclosed in my copending application, Serial No. 529,230, filed August 18, 1955, and assigned to the same assignee as the present invention. As shown in that application, the transistor has first and second junctions serially connected with the circuit to be closed and the switch is turned "off" and "on" by the application of suitable potentials to the control or base electrode of the transistor. When the switch is in the "on" condition and in the absence of signals, both junctions are biased in the forward direction as if they were emitter junctions. The instantaneous value of the signal determines which of the junctions functions as an emitter junction and which of the junctions functions as a collector junction. During positive half-cycles, the signal current adds to the base current, and during negative half-cycles, the signal current subtracts from the base current when a PNP transistor is used. Since it is necessary to supply the transistor with a saturating base current during the entire signal cycle, it is necessary to provide a controlling potential source of high enough potential to offset the degenerative effect of the signal during negative half-cycles.

The switch disclosed in the above-identified application is capable of switching communication and other low power signals with a relatively small amount of controlling D.-C. power. However, when the switch is used for switching ringing power or any other high power signal, an appreciable amount of controlling D.-C. power is required for operation of the switch.

Accordingly, it is the general object of this invention to provide a new and improved electronic switch for opening and closing electrical circuits.

It is a more particular object of this invention to provide a new and improved electronic switch capable of switching relatively large amounts of power under control of a relatively small amount of power.

According to the present invention, a tertiary winding is provided on the ouput transformer by means of which the switched output signal is reflected into the base circuit in such a way that the value of base current is held substantially constant during the entire signal cycle. As a result, the controlling D.-C. base current source need be only a relatively small voltage source with a sufficient current capacity to hold the transistor saturated for the maximum peak signal current experienced during operation.

Further objects and advantages of the invention will become apparent as the following description proceeds, and features of novelty which characterize the invention will be pointed out in particularity in the claims annexed to and forming a part of this specification.

For a better understanding of the invention, reference may be had to the drawing which shows the preferred embodiment of the invention.

Referring to the drawing, it will be noted that a PNP junction transistor has been used to illustrate the invention. As is well known in the art, an NPN junction transistor could be used in the same circuit by merely reversing the polarity of the biasing potentials. The transistor shown has been given the notation of an arrow superimposed on both the so-called emitter and collector electrodes. This notation signifies that the transistor is bilateral in operation and has good amplification with either junction used as the emitter. Most transistors have this characteristic to a sufficient extent although better results can be achieved with transistors specially designed to have good forward and reverse characteristics.

It can be seen that the electronic switch comprises a PNP junction transistor interposed in a connection between a suitable source of signals, such as signal generator 5, and a load resistor 9. Signal generator 5 is connected between the common circuit point or ground and electrode 2 of transistor 1, while winding 7 of the output transformer is connected between ground and electrode 3 of transistor 1. The conductivity of transistor 1 is controlled over a connection to its control or base electrode 4 through the tertiary winding 6 of the output transformer.

A simple mechanical switch S has been shown for the purpose of controlling the "off-on" condition of the transistor switch. It is to be understood that any well known means may be used to control the application of control potentials to the base electrode.

With switch S in the "off" position, transistor 1 is rendered non-conductive since a PNP transistor is non-conductive whenever the base is positive with respect to the emitter. Switch S serves to connect positive potential source +E to the base electrode 4, while electrodes 2 and 3 are at ground potential by virtue of the ground connection to signal source 5 and output transformer winding 7. Obviously, potential source +E should be of higher potential than the peak signal voltage blocked by the switch since transistor 1 would conduct if electrode 2 became positive with respect to base electrode 4.

With transistor 1 in the non-conducting condition, a large insertion loss is presented to the signals since a T-type attenuator is formed between the back resistance of the first junction, transformer winding 6, the back resistance of the second junction, and the load impedance.

When switch S is operated to its "on" position, negative potential source —E is connected to base electrode 4 and transistor 1 is rendered conductive to close the circuit between the input and output circuits. In the absence of signals, both junctions of transistor 1 are biased in the forward direction as if they were emitter junctions. Base current flows from ground through signal generator 5 and winding 7 of the output transformer and through both junctions of transistor 1 to the negative potential source —E. Negative potential source —E should be of high enough potential so that a saturating base current flows in transistor 1.

During the half-cycle of an input signal which causes electrode 2 of transistor 1 to become positive with respect to ground, the junction between electrodes 2 and 4 acts as an emitter junction and the junction between electrodes 3 and 4 acts as a collector junction to conduct the signal current. Electrode 3 then follows the potential of electrodes 2 and 4. If winding 6 were replaced with a resistor, it can be seen that the signal would add to the base current since the potential of electrode 4 rises from ground potential to the potential of the positive peak of the signal. Windings 6 and 7 of the output transformer are so constructed and arranged, however, that the switched output signal is reflected into the base circuit in such a way that the base current is held constant. Windings 6 and 7 are parallel wound on a soft iron core with equal number of turns so that the coupling between the windings approaches unity. When the upper end of winding 7 becomes more positive, the upper end of winding 6 becomes more positive. Thus, during the positive half-cycle of the signal, the voltage induced in winding 6 opposes the voltage of negative potential source —E so as to maintain the saturating base current substantially constant.

During the half-cycle of an input signal which causes electrode 2 to become negative with respect to ground, the junction between electrodes 3 and 4 acts as an emitter and the junction between electrodes 2 and 4 conducts the signal current as if it were a saturated collector junction. The negative signal on electrode 2 therefore appears at electrode 3. If winding 6 were replaced with a resistor, it can be seen that the signal would subtract from the base current since the potential of electrode 4 would fall from ground potential to the potential of the negative peak of the signal. However, when the upper end of winding 7 becomes more negative, the upper end of winding 6 becomes more negative. Thus, during the negative half-cycle of the signal, the voltage induced in winding 6 aids the voltage of negative potential source —E so as to maintain the saturating base current substantially constant.

The signals appearing in winding 7 are, of course, coupled to load resistor 9 through winding 8 of the output transformer. It will be obvious from the above that the output transformer must be individual to the transistor 1 but that the input from the signal generator may be common to a number of circuits. For example, the signal generator 5 may be a source of ringing power, which may have any wave form, which is selectively connected to a desired called line by turning on the electronic switch interposed in a connection between the generator and that line.

While there has been disclosed what is considered at present to be the preferred embodiment of the invention, other modifications will readily occur to those skilled in the art. It is not, therefore, desired that the invention be limited to the specific arrangement shown and described, and it is intended to cover in the appended claims all such modifications as fall within the true spirit and scope of the invention.

What is claimed is:

1. An electronic switch comprising a semi-conductive device having first and second emitter-collector junctions, and a control electrode, an input circuit connected to said first junction, an output circuit connected to said second junction, a control circuit connected to said control electrode, means associated with said control circuit for enabling said device to pass electrical signals with the instantaneous value of said signals determining which of said first and second junctions functions as an emitter junction and which of said first and second junctions functions as a collector junction, and means for maintaining the value of current in said control circuit substantially constant regardless of the instantaneous value of the signal passed by the switch.

2. An electronic switch comprising a transistor having first and second junctions, and a base electrode, an input circuit connected to said first junction, an output circuit connected to said second junction, a first source of potential, means for connecting said first source of potential to said base electrode, said transistor being responsive to the connection of said first source of potential to said base electrode to block the transmission of signals from said input circuit to said output circuit, a second source of potential, means for connecting said second source of potential to said base electrode, said second source of potential having a voltage value such that a saturating base current flows in said transistor in the absence of signals, and means for maintaining the value of base current substantially constant regardless of the instantaneous value of the signal passed by the transistor.

3. An electronic switch comprising a semi-conductive device having first and second emitter-collector junctions, and a control electrode, an input circuit connected to said first junction, an output circuit connected to said second junction, a control circuit connected to said control electrode, means associated with said control circuit for enabling said device to pass electrical signals with the instantaneous value of said signals determining which of said first and second junctions functions as an emitter junction and which of said first and second junctions functions as a collector junction, a transformer having first and second windings, means for connecting one of said windings in said output circuit, means for connecting the other of said windings in said control circuit, said windings being so constructed and arranged that the current flowing in said output circuit induces a potential in said control circuit of such polarity and magnitude that the value of current in said control circuit remains substantially constant regardless of the instantaneous value of the signal passed by the switch.

4. An electronic switch comprising a transistor having first and second junctions, and a base electrode, an input circuit connected to said first junction, an output circuit connected to said second junction, a control circuit connected to said base electrode, a first source of potential, means for connecting said first source of potential to said control circuit, said first source of potential having a voltage value such that said transistor blocks the transmission of signals from said input circuit to said output circuit, a second source of potential, means for connecting said second source of potential to said control circuit, said second source of potential having a voltage value such that a saturating base current flows in said control circuit in the absence of signals, a transformer having first and second windings, means for connecting one of said windings in said output circuit, means for connecting the other of said wnidings in said control circuit, said windings being so constructed and arranged that the current flowing in said output circuit induces a potential in said control circuit of such polarity and magnitude that the value of current in said control circuit remains substantially constant regardless of the instantaneous value of the signal passed by the transistor.

5. In combination, an electronic switch comprising a semi-conductive device having first and second electrodes, and a control electrode, a transformer having first and second windings, a signal source, a source of potential having first and second terminals, means for connecting said signal source between said first electrode and a common circuit point, means for connecting said first winding between said second electrode and the common circuit point, means for connecting said second winding between said control electrode and the first terminal of said source of potential, and means for connecting said second terminal of said source of potential to the common circuit point, said source of potential being of such polarity and magnitude that the device is enabled to pass signals, said windings being so constructed and arranged that the current flowing in said first winding induces a potential in said second winding of such polarity and magnitude that the value of current flowing in said second winding remains substantially constant regardless of the instantaneous value of the signal passed by the switch.

6. In combination, an electronic switch comprising a transistor having first and second emitter-collector junctions, and a base electrode, an input circuit comprising a source of signals connected between said first junction and a common circuit point, a transformer having first and second windings, an output circuit comprising said first winding connected between said second junction and the common circuit point, a base circuit comprising said second winding and a source of potential connected in series between said base electrode and the common circuit point, said source of potential being of such polarity and magnitude that said transistor is enabled to pass signals from said input circuit to said output circuit with the instantaneous value of the signal determining which of said first and second junctions functions as an emitter junction and which of said first and second junctions functions as a collector junction, said windings being so constructed and arranged that the current flowing in said output circuit induces a potential in said base circuit of such polarity and magnitude that the value of current flowing in said base circuit remains substantially constant regardless of the instantaneous value of the signal.

References Cited in the file of this patent

UNITED STATES PATENTS

| | | |
|---|---|---|
| 1,835,099 | Stone | Dec. 8, 1931 |
| 2,266,509 | Percival | Dec. 16, 1941 |
| 2,691,073 | Lowman | Oct. 5, 1954 |

OTHER REFERENCES

Publication: "Electronics," November 1955, pages 132, 1933.